United States Patent
Alexander et al.

(10) Patent No.: US 10,599,431 B2
(45) Date of Patent: Mar. 24, 2020

(54) MANAGING BACKEND RESOURCES VIA FRONTEND STEERING OR STALLS

(71) Applicant: International Business Machines Corporation, Armonk, NY (US)

(72) Inventors: Gregory W. Alexander, Pflugerville, TX (US); David S. Hutton, Leon, FL (US); Christian Jacobi, West Park, NY (US); Edward T. Malley, New Rochelle, NY (US); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 15/651,558

(22) Filed: Jul. 17, 2017

(65) Prior Publication Data

US 2019/0018676 A1    Jan. 17, 2019

(51) Int. Cl.
*G06F 9/30* (2018.01)
*G06F 9/40* (2006.01)
*G06F 5/12* (2006.01)
*G06F 5/14* (2006.01)
(Continued)

(52) U.S. Cl.
CPC .......... *G06F 9/3009* (2013.01); *G06F 9/3836* (2013.01); *G06F 5/12* (2013.01); *G06F 5/14* (2013.01); *G06F 9/3802* (2013.01); *G06F 9/3814* (2013.01); *G06F 9/3855* (2013.01); *G06F 9/4881* (2013.01)

(58) Field of Classification Search
CPC .... G06F 9/3009; G06F 9/3836; G06F 9/4881; G06F 9/3814; G06F 9/3855; G06F 9/3802; G06F 9/383; G06F 5/12; G06F 5/14

USPC .......................... 712/214, 215, 207; 710/57
See application file for complete search history.

(56) References Cited

U.S. PATENT DOCUMENTS

| | | | |
|---|---|---|---|
| 5,845,102 A * | 12/1998 | Miller | G06F 9/30145 712/211 |
| 6,721,874 B1 | 4/2004 | Le et al. | |
| 6,931,639 B1 | 8/2005 | Eickemeyer | |

(Continued)

OTHER PUBLICATIONS

Alexander, et al. "Cache Miss Thread Balancing"; U.S. Appl. No. 15/451,858, filed Mar. 7, 2017.
(Continued)

*Primary Examiner* — Daniel H Pan
(74) *Attorney, Agent, or Firm* — Cantor Colburn LLP; William Kinnaman (57) ABSTRACT

Embodiments of the present invention provide a system for balancing a global completion table (GCT) in a microprocessor via frontend steering or stalls. A non-limiting example of the system includes an instruction dispatch unit (IDU) that includes an instruction queue and the system includes an instruction sequencing unit (ISU) that includes a GCT having a first area and a second area. The IDU is configured to determine whether a full group of instructions exist in the instruction queue and to determine whether additional instructions will be received by the instruction queue in a subsequent cycle. The IDU is configured to stall the instruction queue for at least one cycle until a full group of instructions is accumulated at the instruction queue upon determining that additional instructions will be received by the instruction queue in subsequent cycle.

18 Claims, 6 Drawing Sheets

(51) Int. Cl.
*G06F 9/38* (2018.01)
*G06F 9/48* (2006.01)

(56) References Cited

U.S. PATENT DOCUMENTS

| | | |
|---|---|---|
| 7,668,979 B1* | 2/2010 | Wentzlaff ............ G06F 13/4022 |
| | | 710/33 |
| 8,850,446 B2 | 9/2014 | Avni et al. |
| 9,128,754 B2 | 9/2015 | Shankar et al. |
| 2004/0210743 A1 | 10/2004 | Burky et al. |
| 2004/0215944 A1 | 10/2004 | Burky et al. |
| 2004/0216103 A1 | 10/2004 | Burky et al. |
| 2004/0216105 A1 | 10/2004 | Burky et al. |
| 2006/0075301 A1* | 4/2006 | Fossum ................ G06F 9/3824 |
| | | 714/38.13 |
| 2006/0179280 A1 | 8/2006 | Jensen et al. |
| 2008/0177983 A1 | 7/2008 | Piry et al. |
| 2009/0249349 A1 | 10/2009 | Bose et al. |
| 2013/0007423 A1 | 1/2013 | Burcea et al. |
| 2013/0138924 A1* | 5/2013 | Gunna ................ G06F 9/3836 |
| | | 712/205 |
| 2014/0201507 A1 | 7/2014 | Jayaseelan et al. |
| 2015/0286261 A1* | 10/2015 | Bose ...................... G06F 1/324 |
| | | 713/322 |

OTHER PUBLICATIONS

Cazorla, et al.; "DCache Warn: an I-Fetch Policy to Increase SMT Efficiency", IEEE Computer Society; Proceedings of the 18th International Parallel and Distributed Processing Symposium; 2004; 10 pages.

* cited by examiner

MANAGING BACKEND RESOURCES VIA FRONTEND STEERING OR STALLS

BACKGROUND

The present invention generally relates to an improved data processing system, and more specifically to balancing backend resources (e.g., a global completion table) in a multithreaded data processing system via frontend steering or stalls.

Conventional data processing systems and microprocessor systems incorporate simultaneous multithreading techniques to manage utilization of computing resources and computer performance. These data processing systems can experience starvation of backend processing resources if the processing resources are not efficiently managed.

SUMMARY

Embodiments of the present invention provide a computer-implemented method for balancing a global completion table (GCT) in a microprocessor via frontend steering or stalls. A non-limiting example of the computer-implemented method includes receiving instructions by an instruction dispatch unit (IDU) for processing by an instruction sequencing unit (ISU), in which the IDU includes an instruction queue, a first side of the instruction dispatch unit, and a second side of the instruction dispatch unit. The ISU includes a GCT comprising a first area and a second area. The computer-implemented method includes determining, by the IDU, whether a full group of instructions exist in the instruction queue. Upon determining that a full group of instructions does not exist in the instruction queue, determining, by the IDU, whether additional instructions will be received by the instruction queue in a subsequent cycle. Upon determining that additional instructions will be received by the instruction queue in subsequent cycle, stalling, by the IDU, the instruction queue for at least one cycle until a full group of instructions is accumulated at the instruction queue. After the full group of instructions is accumulated at the instruction queue, releasing the stall by the IDU and allowing the instructions to dispatch on both the first side of the IDU and the second side of the IDU.

Embodiments of the present invention provide a system for balancing a global completion table (GCT) in a microprocessor via frontend steering or stalls. A non-limiting example of the system includes an instruction dispatch unit (IDU) and an instruction sequencing unit (ISU). The IDU includes an instruction queue that is configured to receive instructions. The ISU includes a GCT, in which the GCT includes a first area and a second area. The first area of the GCT is configured to receive instructions that are dispatched from a first side of the IDU. The second area of the GCT is configured to receive instructions that are dispatched from a second side of the IDU. The IDU is configured to determine whether a full group of instructions exist in the instruction queue. The IDU is configured to, upon determining that a full group of instructions does not exist in the instruction queue, determine whether additional instructions will be received by the instruction queue in a subsequent cycle. The IDU is configured to, upon determining that additional instructions will be received by the instruction queue in subsequent cycle, stall the instruction queue for at least one cycle until a full group of instructions is accumulated at the instruction queue. The IDU is configured to release the stall and allow the instructions to dispatch on both the first side of the IDU and the second side of the IDU after the full group of instructions is accumulated at the instruction queue. In some embodiments of the present invention the system is an apparatus that is separate and distinct form the microprocessor. In some embodiments of the present invention, the system is embedded within the microprocessor.

Embodiments of the invention provide a computer program product for balancing a global completion table via frontend steering or stalls, the computer program product comprising a computer readable storage medium having program instructions embodied therewith. The program instructions are executable by a processor to cause the processor to perform a method. A non-limiting example of the method includes receiving instructions by an instruction dispatch unit (IDU) for processing by an instruction sequencing unit (ISU), in which the IDU includes an instruction queue, a first side of the instruction dispatch unit, and a second side of the instruction dispatch unit. The ISU includes a GCT comprising a first area and a second area. The method includes determining, by the IDU, whether a full group of instructions exist in the instruction queue. Upon determining that a full group of instructions does not exist in the instruction queue, determining, by the IDU, whether additional instructions will be received by the instruction queue in a subsequent cycle. Upon determining that additional instructions will be received by the instruction queue in subsequent cycle, stalling, by the IDU, the instruction queue for at least one cycle until a full group of instructions is accumulated at the instruction queue. After the full group of instructions is accumulated at the instruction queue, releasing the stall by the IDU and allowing the instructions to dispatch on both the first side of the IDU and the second side of the IDU.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

A goal of modern microprocessor design is to utilize processor resources as efficiently as possible. One such resource is a Global Completion Table (GCT), which is configured to track instructions from dispatch to completion while the instructions are in flight. As GCTs normally include a finite number of entries, the GCT may become a limiting performance factor of the microprocessor if the entries of GCT are filled in unbalanced manner. Moreover, if dispatch of instructions to the GCT becomes imbalanced, the GCT would reflect the imbalance by wasting entries, which results in hurting overall microprocessor performance.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, some data processing systems and microprocessor systems are known to track dispatch of instructions via a GCT, in which the GCT receives instructions dispatched from an instruction queue. When the GCT becomes full, however, a stall of the instruction queue is often requested, which can result from starvation of the computational resources of instruction queue and inefficient usage of entries of the GCT. A variety of detrimental effects may occur when an instruction queue is starved. For example, in some systems, the GCT includes two areas in which each area is designated to receive instructions from a different segment of an instruction dispatch unit (IDU). GCTs are often filled via a thermometer function (e.g., entries in a first area of the GCT are filled prior to filling entries of other areas of the GCT). In the event that a first area of the GCT becomes full, the system would stall dispatch of further instructions even if other areas of the GCT remain unused. This event may result in inefficient management of resources of the processor. In some situations when an instruction queue is starved, there is the potential that instructions will be dispatched from only one of the segments of the IDU, which can result in filling only the first area of the GCT, which leaves the second area of the GCT empty or underused.

Consider a microprocessor design that includes six dispatch pipes and an IDU. Among those six pipes, the first three corresponding to a first side of an IDU (e.g., ID-A), while the second three correspond to a second side of an IDU (e.g., ID-B). Assuming that the GCT is split into two halves, the first half (GCT-A) being configured to manage instructions dispatched on side A, while the second half (e.g., GCT-B) being configured to manage instructions on side B. If the IDU were to become starved (e.g., by a cache miss, pipeline restart etc.), the number of instructions being produced at dispatch time would be limited. In such an event, processor resources may become limited to the point where all dispatches are occurring on only a first side of the IDU (e.g., ID-A). This results in no dispatches occurring on the second side of the IDU (e.g., ID-B).

This presents a problem for the GCT. If only IDU-A instructions are being produced, then only GCT-A entries will be populated, while GCT-B entries go unused. Once GCT-A fills up, it may become necessary to stall dispatch until some of those instructions have completed released even if GCT-B is completely unused. Stalling in the manner above effectively halves the number of instructions that can be in flight from dispatch to completion, which may result in limited performance by the processor.

Turning now to an overview of the aspects of the invention, one or more embodiments of the invention address the above-described shortcomings of the prior art by managing back end resources (e.g. global completion table resources) via frontend steering or stalls such that instructions are stalled from dispatch from an instruction queue if it is detected that an IDU would only be able to generate a first side dispatch from the instructions of the instruction queue. Earlier stages in the processor pipeline are then examined and if it is detected that new instructions are on their way, dispatch is stalled until the new instructions catch up. Once a full group of instructions is accumulated, the stall is released and instructions are allowed to dispatch on all sides of the IDU to the GCT at approximately the same time. As the GCT includes two or more areas that are each designated to receive instructions from a different respective side of the IDU, the stalling of the instructions keeps the GCT balanced as instructions that are dispatched to the GCT are evenly distributed among the areas of the GCT.

Figure 1:
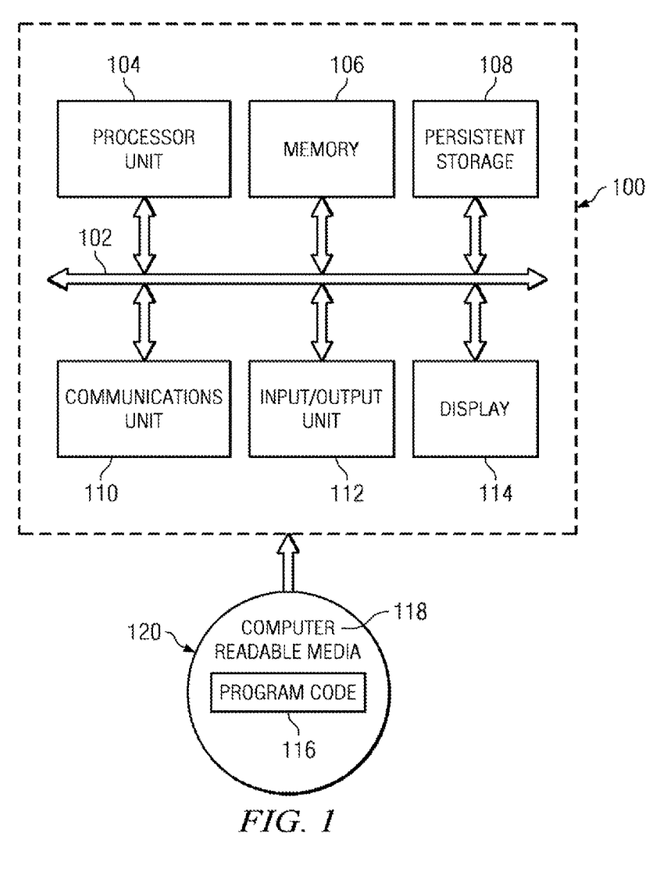
FIG. 1 depicts a block diagram of a data processing system capable of implementing one or more embodiments of the present invention.

Turning now to a more detailed description of the present disclosure, FIG. 1 illustrates a high level block diagram showing an example of a data processing system 100 useful for implementing one or more embodiments of the invention. With reference now to FIG. 1, as will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in any tangible medium of expression having the computer usable program code embodied in the medium.

Any combination of one or more computer usable or computer readable medium(s) may be utilized. The computer usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the illustrative example of FIG. 1, data processing system 100 includes communications fabric 102, which provides communications between processor unit 104, memory 106, persistent storage 108, communications unit 110, input/output (I/O) unit 112, and display 114.

Processor unit 104 serves to execute instructions for software loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Figure 2:
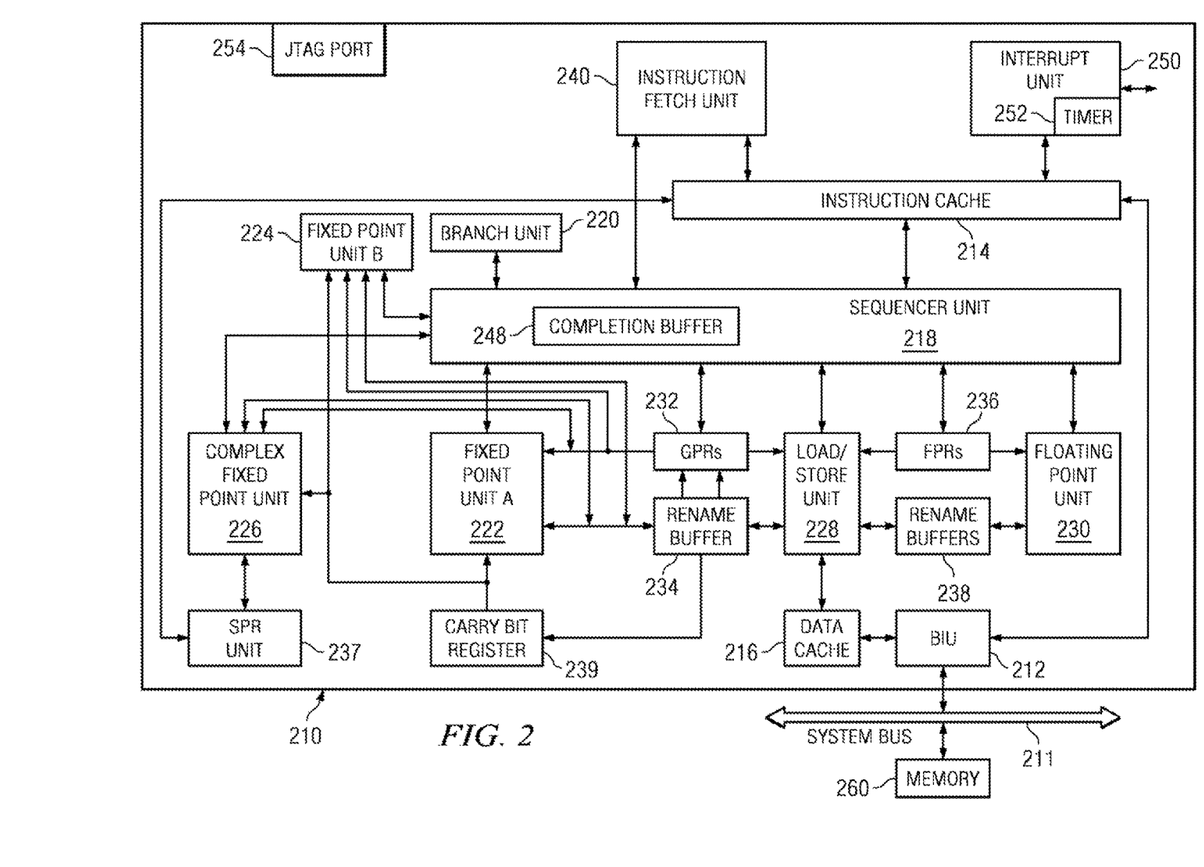
FIG. 2 depicts a block diagram of a multithreaded processor that is capable of balancing a global completion table via frontend steering or stalls according to one or more embodiments of the present invention.

FIG. 2 is a block diagram of a multithreaded processor design showing functional units and registers for implementing one or more embodiments of the present invention. Processor 210 is an example of processor unit 104 of FIG. 1. In at least one embodiment, processor 210 is a simultaneous multithread (SMT) processor 210. The SMT processor 210 includes one or more circuits to balance a global completion table via frontend steering or stalls according to one or more embodiments of the present invention. For example, a first circuit can determine whether a full group of instructions exist in an instruction queue. A second circuit can determine whether additional instructions will be received in a subsequent clock cycle. A third circuit can stall the instruction queue for at least one cycle until a full group of instructions is accumulated. A fourth circuit can release the stall and allow instructions to dispatch on all sides of an instruction dispatch unit according to one or more embodiments that are discussed in greater detail below.

In an exemplary embodiment, processor 210 is a single integrated circuit superscalar microprocessor. Accordingly, as discussed further herein below, processor 210 includes various units, registers, buffers, memories, and other sections, all of which are formed by integrated circuitry. In addition, in an exemplary embodiment, processor 210 operates according to reduced instruction set computer ("RISC") techniques. As shown in FIG. 2, system bus 211 connects to bus interface unit ("BIU") 212 of processor 210. BIU 212 controls the transfer of information between processor 210 and system bus 211.

BIU 212 connects to an instruction cache 214 and to data cache 216 of processor 210. The instruction and data caches 214 and 216 may, in general, be implemented as a cache hierarchy of multiple levels (e.g., L1, L2, L3, L4, . . . etc.).

Instruction cache 214 outputs instructions to sequencer unit 218. In response to such instructions from instruction cache 214, sequencer unit 218 selectively outputs instructions to other execution circuitry of processor 210. A translation lookaside buffer (TLB) is a table in the processor's memory that contains information about the pages in memory the processor accessed recently. The TLB may be used to translate virtual addresses—derived from the address generation mechanisms implicit in the user-level program code, as generated by sequencer unit 218 and load/store unit 228—into real or physical addresses that map into the actual memory address space allocated for the given application program.

In addition to sequencer unit 218, in an exemplary embodiment, the execution circuitry of processor 210 includes multiple execution units, which can include, for example a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. In addition, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238. In response to a load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 causes instruction fetch unit 240 to fetch the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211. In some embodiments of the present invention, embedded within sequencer unit 218 is an instruction decode unit and an instruction dispatch unit. In some embodiments of the present invention, the instruction decode unit and/or the instruction dispatch unit are embedded in the instruction cache 214 or between the instruction cache 214 and the sequencer unit 218. The instruction decode unit decodes instructions and passes decoded instructions to the instruction dispatch unit. The instruction dispatch unit selectively groups decoded instructions from instruction decode unit for each thread and outputs a group of instructions for each thread.

In response to the instructions input from instruction cache 214, sequencer unit 218 selectively dispatches the instructions to selected ones of execution units 220, 222, 224, 226, 228, and 230. In some embodiments of the present invention, sequencer unit 218 includes an instruction dispatch unit and an instruction sequencing unit, in which the instruction dispatching unit dispatches instructions in order to the instruction sequencing unit, and the instruction sequencing unit issues instructions out of order to the selected ones of execution units 220, 222, 224, 226, 228, 230 (not shown). Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

Information stored at a selected one of fixed-point rename buffers 234 is associated with a storage location (e.g. one of GPRs 232 or carry bit (CA) register 239) as specified by the instruction for which the selected rename buffer is allocated. Information stored at a selected one of fixed-point rename buffers 234 is copied to its associated one of GPRs 232 (or CA register 239) in response to signals from sequencer unit 218. Sequencer unit 218 directs such copying of information stored at a selected one of fixed-point rename buffers 234 in response to "completing" the instruction that generated the information. Such copying is called "writeback."

Upon storing information at a selected one of floating-point rename buffers 238, such information is associated with one of FPRs 236. Information stored at a selected one of floating-point rename buffers 238 is copied to its associated one of FPRs 236 in response to signals from sequencer unit 218. Sequencer unit 218 directs such copying of information stored at a selected one of floating-point rename buffers 238 in response to "completing" the instruction that generated the information.

Within sequencer unit 218, completion buffer 248 tracks the completion of the multiple instructions, which are being executed within the execution units. Upon an indication that an instruction or a group of instructions have been completed successfully, in an application specified sequential order, completion buffer 248 may be utilized to initiate the transfer of the results of those completed instructions to the associated general-purpose registers. Completion buffer 248 comprises a global completion table (GCT) which includes entry fields that keep track of valid (live) instructions within the processor 210.

Additionally, processor 210 includes interrupt unit 250. Interrupt unit 250 connects to instruction cache 214. Additionally, although not shown in FIG. 2, interrupt unit 250 connects to other functional units within processor 210, including sequencer unit 218. Interrupt unit 250 may receive signals from other functional units and initiate an action, such as starting an error handling or trap process. In these examples, interrupt unit 250 generates interrupts and exceptions that may occur during execution of a program. Interrupt unit 250 includes timer 252.

Additionally, processor 210 includes JTAG port 254, which connects to an external service element, which is not shown. Latches comprise every element of processor 210. JTAG port 254 connects to all the latches that comprise the elements of processor 210.

Figure 3:
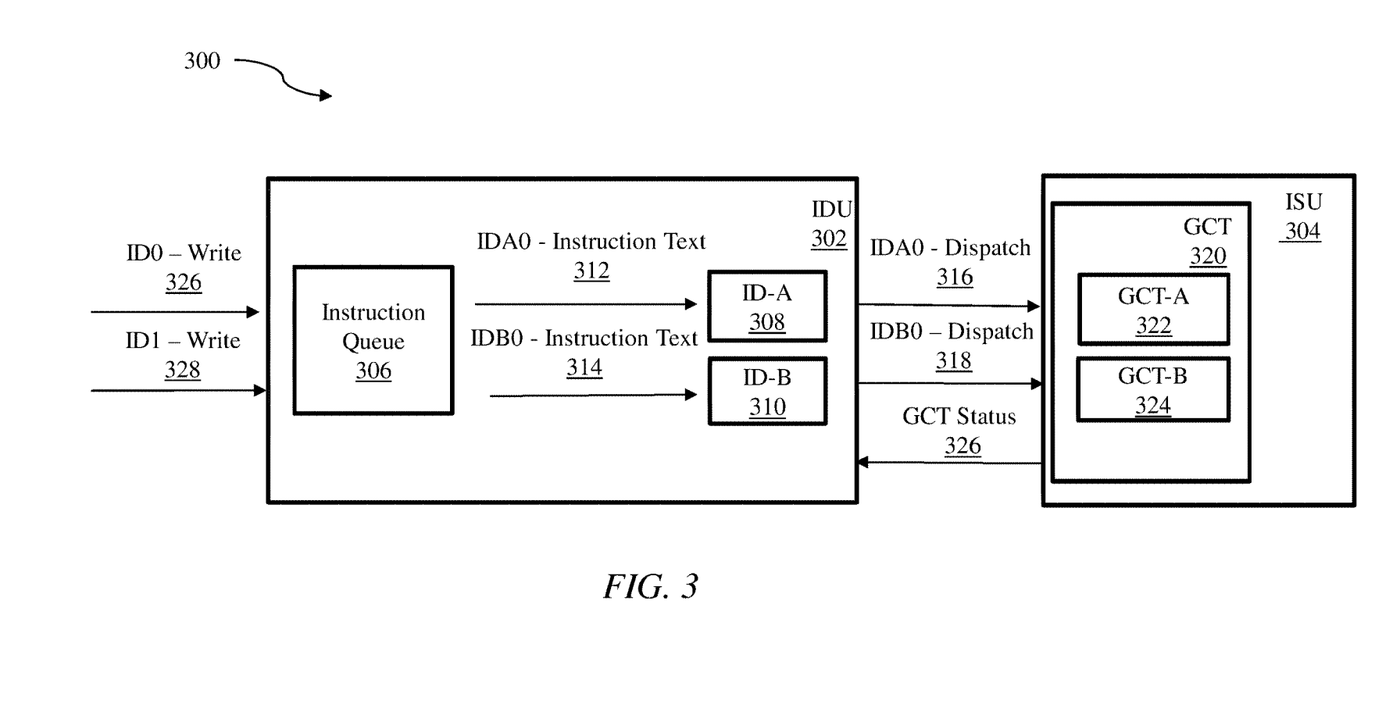
FIG. 3 depicts a block diagram of a portion of a frontend processor pipeline that is capable of balancing a global completion table via frontend steering or stalls according to one or more embodiments of the present invention.

FIG. 3 is a block diagram of a portion of an exemplary processor pipeline that is capable of balancing a global completion table via frontend steering or stalls according to one or more embodiments of the present invention. In particular, FIG. 3 depicts a portion of a frontend processor pipeline implemented by a microprocessor such as, for example, a single superscalar simultaneous multithread (SMT) microprocessor core (CPU). An example of the superscalar SMT processor is processor 210 of FIG. 2.

In some embodiments of the present invention, the processor includes a number of stages in the processor pipeline. In a first stage, referred to as an instruction fetch stage, the processor fetches an instruction from memory or associative memory structure, each stage including one or more pipelines. Then, in a decode stage, the processor decodes the instruction into different control bits, which in general designate a type of functional unit for performing the operation specified by the instruction, source operands for the operation, and destinations for results of operations. In a dispatch stage, the processor dispatches the decoded instruction per the control bits to a unit having an execution stage, or possibly to an intervening reservation station or issue queue, which ultimately issues the instruction to an associated execution stage (also "execution unit"). The execution stage processes the operation as specified by the instruction. Executing an operation specified by an instruction includes accepting one or more operands and producing one or more results. A completion stage deals with program order issues that arise from concurrent execution, wherein multiple, concurrently executed instructions may deposit results in a single register. The completion stage also handles recovery issues arising from instructions subsequent to an interrupted instruction depositing results in their destination registers. This stage is also sometimes called a writeback stage since it is at this time that results of the execution of instructions are written back to designated locations such as registers.

In the illustrative example in FIG. 3, frontend processor pipeline 300 includes an instruction dispatch unit (IDU) 302 and an instruction sequencing unit (ISU) 304, in which the IDU 302 includes an instruction queue 306 and the ISU 304 includes a global completion table (GCT) 320.

Instruction queue 306 is configured to receive instructions (e.g., ID0—Write 326, ID1—Write 328) for processing by the ISU. In some embodiments of the present invention, the instructions are received from memory, such as system memory 106 in FIG. 1. The instruction queue 306 is configured to produce grouped instructions (e.g., IDA0—Instruction Text 312, IDB0—Instruction Text 314), in which each of the produced instructions includes instruction code such as, for example, instruction text. Instruction queue 306 includes a plurality of entries, in which each entry is configured to store a different respective received instruction (e.g., ID0—Write 326, ID1—Write 328). In some embodiments of the present invention, the instruction queue 306 includes at least two entries, in which the first entry stores a first instruction (e.g., ID0—Write 326) and a second entry stores a second instruction (e.g., ID1—Write 328).

Figure 4:
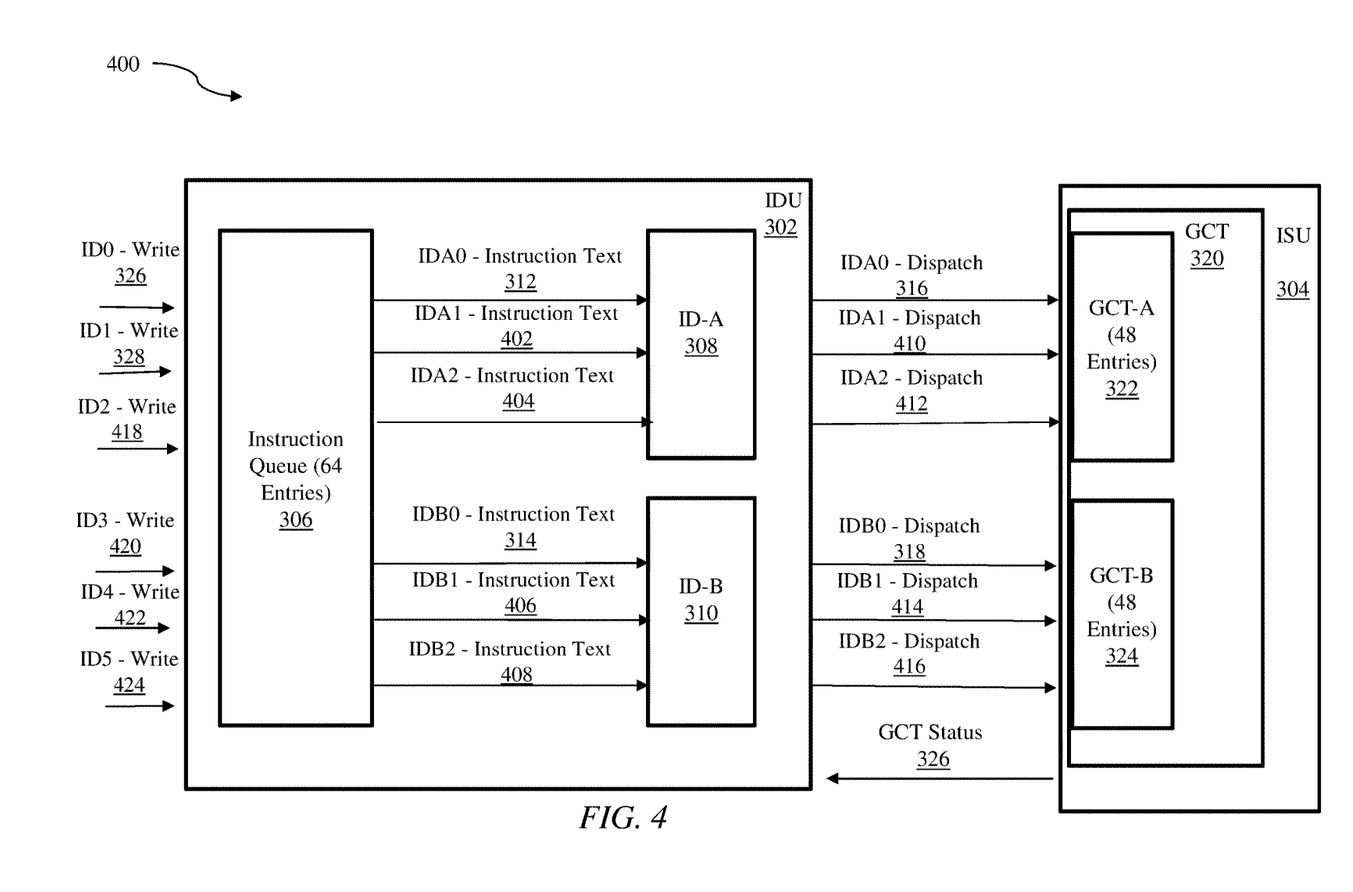
FIG. 4 depicts a block diagram of portion of another frontend processor pipeline that is capable of balancing a global completion table via frontend steering or stalls according to one or more embodiments of the present invention.
Figure 5:
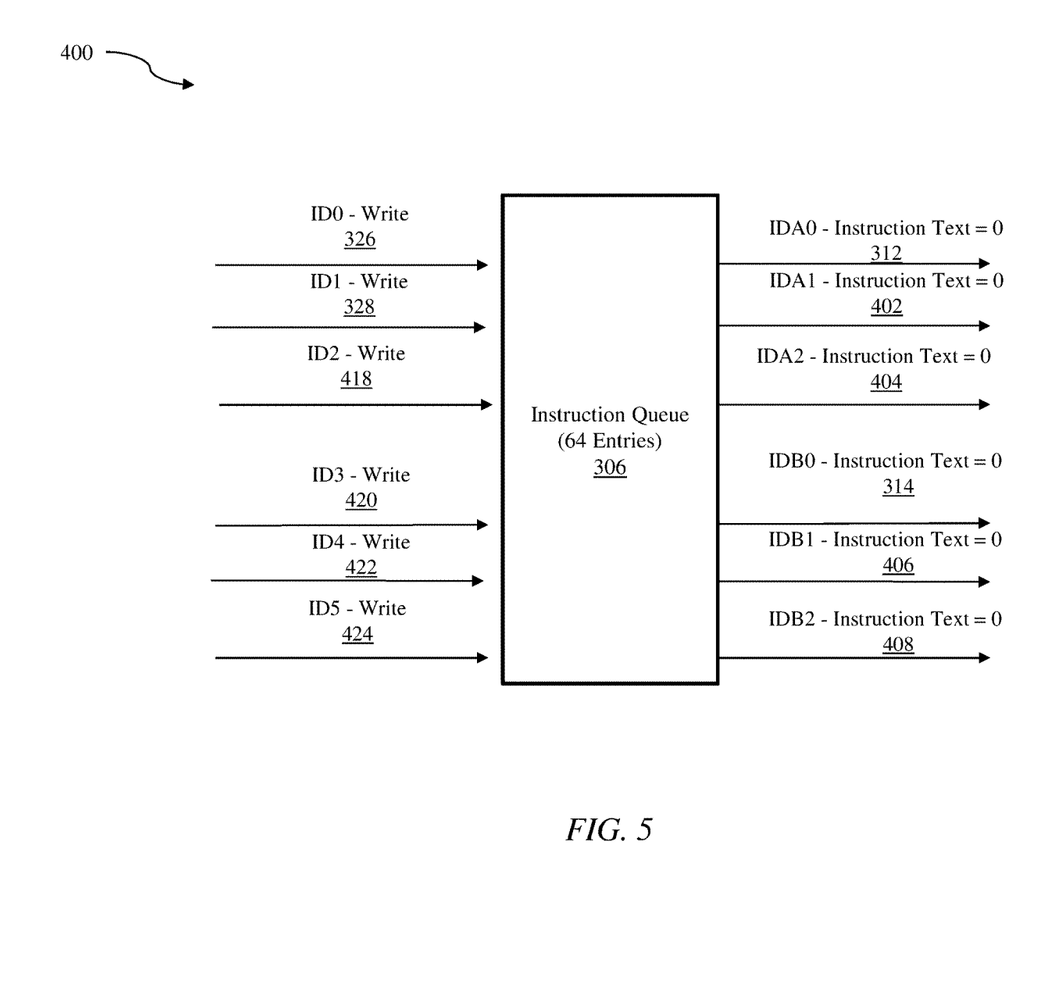
FIG. 5 depicts a block diagram of the frontend processor pipeline of FIG. 4, in which an instruction queue is shown in a stalled state according to one or more embodiments of the present invention.

In some embodiments of the present invention, instruction queue 306 includes 64 entries such as in the example frontend processor pipeline 400 shown in FIGS. 4-5. The instruction queue 306 of frontend processor pipeline 400 is configured to accept up to six ungrouped instructions per cycle (e.g., ID0—Write 326, ID1—Write 329, ID2—Write 418, ID3—Write 420, ID4—Write 422, ID5—Write 424), and to produce up to two triplets of grouped instructions per cycle (e.g., first triplet: IDA0—Instruction Text 312, IDA1—Instruction Text 402, IDA2—Instruction Text 404; and second triplet: IDB0—Instruction Text 314, IDB1—Instruction Text 406, IDB2—Instruction Text 408).

Referring back to FIG. 3, ISU 304 of frontend pipeline 300 includes a global completion table (GCT) that includes a first area 332 (e.g., GCT-A) and a second area 324 (e.g., GCT-B). Each GCT area 332, 325 may be designated by the ISU 304 to receive instructions that are dispatched (e.g., IDA—Dispatch 316, IDB—Dispatch 318) from a particular side of the dispatch unit 302 (e.g., ID-A 308, ID-B 310). For example, in some embodiments of the present invention, the first area 322 of the GCT 320 is configured to receive instructions (e.g., IDA0—Dispatch 316) that are dispatched from a first side (e.g. ID-A 308) of the IDU 302. In some embodiments of the present invention, the second area 324 of the GCT 320 is configured to receive instructions (e.g., IDB0—Dispatch 318) that are dispatched from a second side (e.g., ID-B 310) of the IDU 302. The dispatched instructions (e.g., IDA—Dispatch 316, IDB—Dispatch 318) are decoded versions of the produced grouped instructions (e.g., IDA0—Instruction Text 312, IDB0—Instruction Text 314), in which the dispatched instructions (e.g., IDA0—Dispatch 316, IDB0—Dispatch 318) comprise dispatch data. In some embodiments of the present invention, the dispatch data includes decoded instruction text and ISU data. ISU data is data utilized by ISU 304 to perform one or more operations of the ISU 304.

As shown in FIG. 4, in some embodiments of the present invention, the frontend processor pipeline 400 includes a first area 322 of GCT 320 that is configured to receive a first triplet of instructions (e.g., IDA0—Dispatch 316, IDA1—Dispatch 410, IDA2—Dispatch 412) dispatched from a first side (ID-A 308) of IDU 302. A second area 324 of the GCT 320 of frontend processor pipeline 400 is configured to receive a second triplet of instructions (e.g., IDB0—Dispatch 318, IDB1—Dispatch 414, IDB2—Dispatch 416) dispatched from the second side (ID-B 310) of the IDU 302. In some embodiments of the present invention, the dispatched instructions (e.g., IDA0—Dispatch 316, IDA1—Dispatch 410, IDA2—Dispatch 412, IDB0—Dispatch 318, IDB1—Dispatch 414, IDB2—Dispatch 416) are decoded versions of the produced grouped instructions (e.g., IDA0—Instruction Text 312, IDA1—Instruction Text 402, IDA2—Instruction Text 404, IDB0—Instruction Text 314, IDB1—Instruction Text 406, IDB2—Instruction Text 408), in which the dispatched instructions comprise dispatch data. In some embodiments of the present invention, the dispatch data includes decoded instruction text and ISU data. The ISU data is data utilized by ISU 304 to perform one or more operations of the ISU 304.

Referring back to FIG. 3, IDU 302 of frontend processor pipeline 300 is configured to determine whether to stall the dispatching of instructions (e.g., IDA0—Instruction Text 312, IDB0—Instruction Text 314) from instruction queue 306 to the ISU 304 in order to balance GCT 320 before GCT 320 becomes full. In particular, IDU 302 determines whether a full group of instructions exist in the instruction queue 306. The existence of full group can be determined by, for example, determining by IDU 302 whether IDU 302 is able to generate a dispatch on both sides (e.g., ID-A 308, ID-B 310) of the IDU 302 from the received instructions (e.g., ID0—Write 326, ID1—Write 328) or whether only a first side dispatch (e.g., ID-A 308) is possible (e.g., if generating an IDB0—Dispatch 318 is not possible from the received instructions). If a full group of instructions does not exist, IDU 302 is configured to check whether additional instructions will be received by the instruction queue 306 in a subsequent cycle. This can be achieved by examining one or more earlier stages in the processor pipeline. For example, in some embodiments of the present invention, an earlier stage in the processor pipeline is examined based at least in part on receiving feedback from the fetch unit 240 of FIG. 2 regarding which instructions can be found in instruction cache 214. Other suitable methods of examining earlier stages may be used as understood by persons having skill in the art.

In some embodiments of the present invention, if IDU 302 of frontend processor pipeline 300 determines that additional instructions will be received by the instruction queue 306, IDU 302 is configured to stall the instruction queue 306 for at least one cycle until the full group of instructions is accumulated at the instruction queue 306. After the full group of instructions is accumulated at the instruction queue 306, IDU 302 releases the stall and allows the instructions to dispatch on the first and second sides (e.g., ID-A 308, ID-B 310) of IDU 302. This stalling processor is able to maintain GCT 320 balanced as the first area (e.g., GCT-A 322) of GCT 320 only receives instructions if the second area (e.g., GCT-B 324) would receive instructions as well. Accordingly, in some embodiments of the present invention, instructions are not dispatched from the IDU if the instructions cannot be released on both sides (e.g., ID-A 308, ID-B 310) of IDU 302. In some embodiments of the present invention, upon releasing the stall, IDU 302 allows a first subset of the instructions (e.g., IDA0—Dispatch 316) to dispatch on a first side (e.g., ID-A 308) of the IDU 308 to a first area (e.g., GCT-A 322) of GCT 320, and allows a second subset of the instructions (IDB0—Dispatch 318) to dispatch on a second side (e.g., ID-B 310) of the IDU 302 to a second area (e.g., GCT-B 324) of GCT 320.

In some embodiments of the present invention, IDU 302 of frontend processor pipeline 300 is further configured to allow instructions from the instruction queue 306 to dispatch on both the first side (e.g., ID-A 308, ID-B 310) of the IDU 302 and the second side (e.g., ID-B 310) of the IDU 302 without first stalling the instruction queue 306. This may occur, for example, when balancing functionality of the processor is disabled or bypassed, or when a full group of instructions are determined to exist in the instruction queue 306.

In some embodiments of the present invention, IDU 302 of frontend processor pipeline 300 is configured to receive feedback (e.g., GCT status 326) from ISU 304 regarding the status of GCT table 320. In some embodiments of the present invention, ISU 304 is configured to transmit feedback (e.g., GCT status 326) to IDU 302, in which the feedback (e.g., GCT status 326) that indicates whether at least the first area (e.g., GCT-A 322) of GCT 320 is starved. Based on the received feedback, in some embodiments of the present invention IDU 302 is configured to allow instructions to dispatch on both the first side (e.g., ID-A 308) and the second side (e.g., ID-B 310) of the IDU 302 irrespective of whether a full group of instructions exists in the instruction queue 306. This option to dispatch irrespective of whether a full group of instructions exist is particularly beneficial in the event of a restart of the processor pipeline for example. A restart of the processor pipeline may occur when a branch wrong is detected or a cache is missed for example. Since on restart entries of the instruction queue 306 and GCT 320 may be empty or starved, stalling of the instruction queue 306 is bypassed and instructions are again received by the instruction queue 306 and dispatched irrespective of determining whether a full group exists. In some embodiments of the present invention, IDU 302 is configured to not determine if a full group exists when a restart is detected.

In some embodiments of the present invention, ISU 304 of frontend processor pipeline 300 is configured to transmit feedback (e.g., GCT status 326) to the IDU 302, in which the feedback indicates whether the first and/or second areas (e.g., GCT-A 322, GCT-B 324) of GCT 320 are full. Upon the IDU 302 receiving feedback (e.g., GCT status 326) that indicates that the first or second areas (e.g., GCT-A 322, GCT-B 324) of GCT 320 are full, IDU 302 stalls the instruction queue 306 from dispatching instructions for at least one cycle, in which the stall occurs irrespective of whether the IDU 302 determines that a full group of instructions exists in the instruction queue 306 at that time. This is beneficial as in some embodiments GCT 320 is configured to fill entries found in the first area before filling entries found in the second area. Accordingly, in the event that an area of the GCT 320 is full, a stall may be commenced at the instruction queue 306 irrespective of whether a full group exists in the instruction queue 306. Then the stall is released upon the feedback indicating that the first and second areas (e.g., ID-A 308, ID-B 310) of GCT 320 are not both full.

As noted above, FIG. 4 depicts an example frontend processor pipeline 400 in accordance with one or more embodiments of the present disclose, in which frontend processor pipeline 400 includes instruction queue 306 and GCT 332 that each include 64 entries. Frontend processor pipeline 400 functions in a manner similar to frontend processor pipeline 300, but the instruction queue 306 of frontend processor pipeline 400 is configured to receive up to six ungrouped instructions (e.g., ID0—Write 326, ID1—Write 326, ID20—Write 326, ID3—Write 326, ID4—Write 326, ID5—Write 326) and to produce up to two triplets of grouped instructions per cycle (e.g., IDA0—Instruction Text 312, IDA1—Instruction Text 402, IDA2—Instruction Text 404, IDB0—Instruction Text 314, IDB1—Instruction Text 406, IDB2—Instruction Text 408).

IDU 302 of frontend pipeline 400 is configured to determine whether to stall the dispatching of instructions (e.g., IDA0—Instruction Text 312, IDA1—Instruction Text 402, IDA2—Instruction Text 404, IDB0—Instruction Text 314, IDB1—Instruction Text 406, IDB2—Instruction Text 408) from instruction queue 306 to the ISU 304 in order to balance GCT 320. In particular, IDU 302 determines whether a full group of instructions exist in the instruction queue 306. The existence of full group can be determined by, for example, determining by IDU 302 whether IDU 302 is able to generate a dispatch on both sides (e.g., ID-A 308, ID-B 310) of the IDU 302 from the received instructions (e.g., ID0—Write 326, ID1—Write 328, ID2—Write 418, ID3—Write 420, ID4—Write 422, ID5—Write 424) or whether only a first side dispatch (e.g., ID-A 308) is possible (e.g., if is not possible to generate from the received instructions the following three dispatch instructions: IDB0—Dispatch 318, IDB1—Dispatch 414, IDB2—Dispatch 416). If a full group of instructions does not exist, IDU 302 is configured to check whether additional instructions will be received by the instruction queue 306 in a subsequent cycle. This can be achieved by examining earlier stages in the processor pipeline, such as by receiving feedback from the fetch unit 240 of FIG. 2 regarding which instructions can be found in instruction cache 214.

In some embodiments of the present invention, if IDU 302 of frontend pipeline 400 determines that additional instructions will be received by the instruction queue 306, IDU 302 is configured to stall the instruction queue 306 for at least one cycle until the full group of instructions is accumulated at the instruction queue 306. After the full group of instructions is accumulated at the instruction queue 306, IDU 302 releases the stall and allows the instructions to dispatch on the first and second sides (e.g., ID-A 308, ID-B 310) of IDU 302. Stalling in the instruction queue 306 in the manner above may allow GCT 320 to remained balance balanced as the first area (e.g., GCT-A 322) of GCT 320 would only receive instructions if the second area (e.g., GCT-B 324) would receive instructions as well. Accordingly, in some embodiments of the present invention, instructions are not dispatched from the IDU 302 if the instructions cannot be released on both sides (e.g., ID-A 308, ID-B 310) of IDU 302. In some embodiments of the present invention, upon releasing the stall, IDU 302 allows a first subset of the instructions (e.g., IDA0—Dispatch 316, IDA1—Dispatch 410, IDA2—Dispatch 412) to dispatch on a first side (e.g., ID-A 308) of the IDU 308 to a first area (e.g., GCT-A 322) of GCT 320, and allows a second subset of the instructions (e.g., IDB0—Dispatch 318, IDB1—Dispatch 414, IDB2—Dispatch 416) to dispatch on a second side (e.g., ID-B 310) of the IDU 302 to a second area (e.g., GCT-B 324) of GCT 320.

In some embodiments of the present invention, IDU 302 of frontend processor pipeline 400 is further configured to allow instructions from the instruction queue 306 to dispatch on both the first side (e.g., ID-A 308, ID-B 310) of the IDU 302 and the second side (e.g., ID-B 310) of the IDU 302 without first stalling the instruction queue 306. This may occur, for example, when balancing functionality of the processor is disabled or bypassed, or when a full group of instructions are determined to exist in the instruction queue 306.

In some embodiments of the present invention, IDU 302 of frontend pipeline 400 is configured to receive feedback (e.g., GCT status 326) from ISU 304 regarding the status of GCT table 320. In some embodiments of the present invention, ISU 304 is configured to transmit feedback (e.g., GCT status 326) to IDU 302, in which the feedback that indicates whether at least the first area (e.g., GCT-A 322) of GCT 320 is starved. Based on the received feedback, in some embodiments of the present invention IDU 302 is configured to allow instructions to dispatch on both the first side (e.g., ID-A 308) and the second side (e.g., ID-B 310) of the IDU 302 irrespective of whether a full group of instructions exists in the instruction queue 306. The option to dispatch instructions irrespective of whether a full group of instructions exist is particular beneficial in the event of a restart of the processor pipeline for example. A restart may occur, for example, when a branch wrong is detected or a cache is missed. Since on restart instruction queue 306 and GCT 320 may be empty or starved, stalling of the instruction queue 306 is bypassed, instructions are again received by the instruction queue 306, and then the instructions are dispatched irrespective of determining whether a full group exists. In some embodiments of the present invention, IDU 302 is configured to not determine if a full group exists when a restarted is detected.

In some embodiments of the present invention, ISU 304 of frontend pipeline 400 is configured to transmit feedback (e.g., GCT status 326) to the IDU 302, in which the feedback indicates whether the first and/or second areas (e.g., GCT-A 322, GCT-B 324) of GCT 320 are full. Upon the IDU 302 receiving feedback (e.g., GCT status 326) that indicates that the first or second areas (e.g., GCT-A 322, GCT-B 324) of GCT 320 are full, IDU 302 stalls the instruction queue 306 from dispatching instructions for at least one cycle, in which the stall occurs irrespective of whether the IDU 302 determines that a full group of instructions exists in the instruction queue 306 at that time. This is beneficial as in some embodiments GCT 320 is configured to fill entries found in the first area (e.g., GCT-A 322) before filling entries found in the second area (e.g., GCT-B 324). Accordingly, in the event that an area of the GCT table becomes full, a stall may be commenced at the instruction queue 306 irrespective of whether a full group exists in the instruction queue 306. Then the stall is released upon the feedback (e.g., GCT status 326) indicating that the first and second areas (e.g., ID-A 308, ID-B 310) of GCT 320 are not both full.

FIG. 5 depicts an example portion of the frontend processor pipeline 400 of FIG. 4, in which instruction queue 306 is shown in a stalled state according to one or more embodiments of the present invention. In this example, six ungrouped instructions (e.g., ID0—Write 326, ID1—Write 326, ID20—Write 326, ID3—Write 326, ID4—Write 326, ID5—Write 326) are received by the instruction queue 306. In the stalled state, in some embodiments of the present invention, no instruction text is sent from the instruction queue 306. In some embodiments of the present invention, instruction text is sent from the instruction queue 306 when in the stalled stated, but the instruction text comprises of a null or zero value (e.g., IDA0—Instruction Text 312, IDA1—Instruction Text 402, IDA2—Instruction Text 404, IDB0—Instruction Text 314, IDB1—Instruction Text 406, IDB2—Instruction Text 408).

The architectures depicted in FIG. 3-5 are provided solely for the purpose of illustrating and explaining the embodiments of the present invention, and are not meant to imply any architectural limitations unless specifically claimed.

Figure 6:
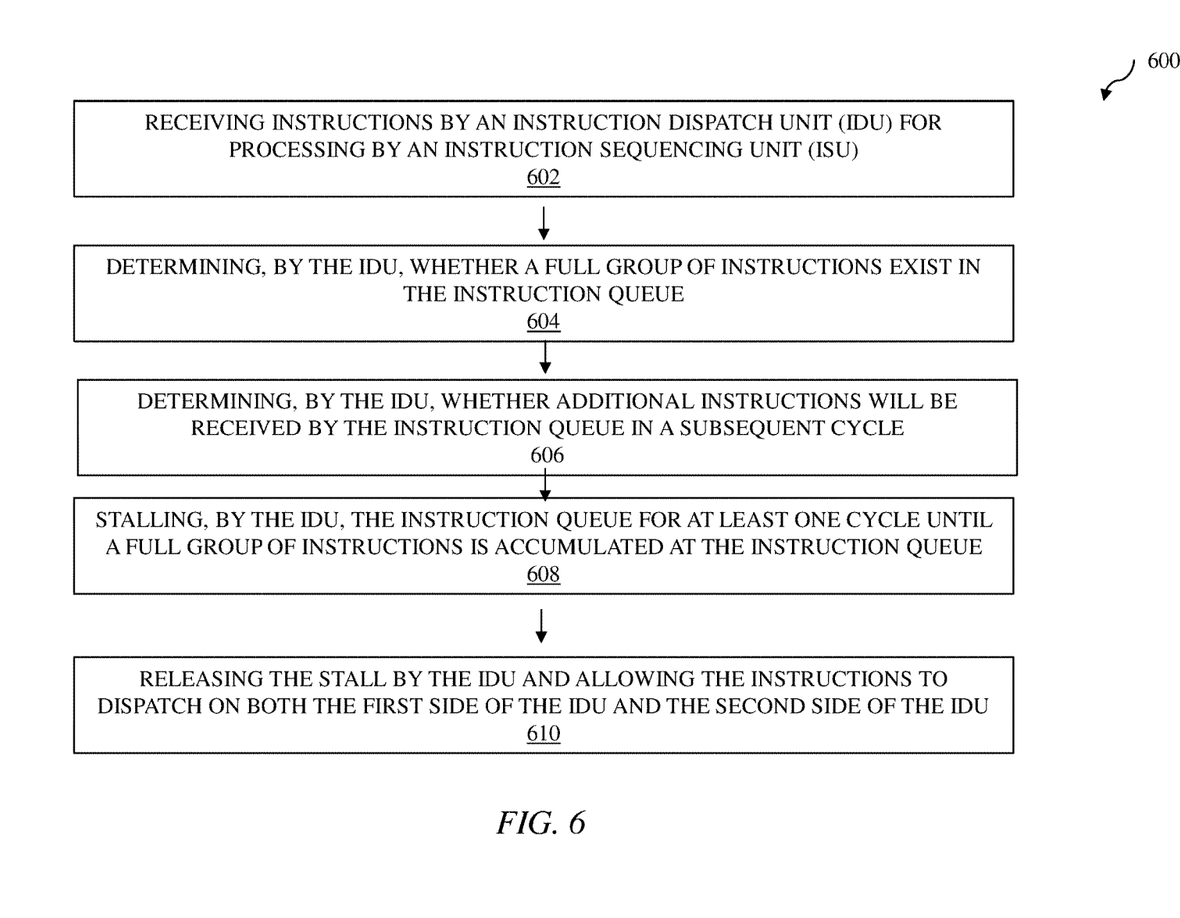
FIG. 6 depicts a flow diagram illustrating a methodology in accordance with one or more embodiments of the present invention.

Additional details of the operation of frontend processor pipelines 300 and 400 will now be described with reference to FIG. 6, wherein FIG. 6 depicts a flow diagram illustrating a methodology 600 according to one or more embodiments of the present invention. At 602, instructions are received by an instruction dispatch unit (IDU) for processing by an instruction sequencing unit (ISU), in which the IDU includes an instruction queue, a first side of the instruction dispatch unit, and a second side of the instruction dispatch unit. The ISU includes a GCT comprising a first area and a second area. At 604, the IDU determines whether a full group of instructions exist in the instruction queue. At 606, upon determining that a full group of instructions does not exist in the instruction queue, the IDU determines whether additional instructions will be received by the instruction queue in a subsequent cycle. At 608, upon determining that additional instructions will be received by the instruction queue in subsequent cycle, the IDU stalls the instruction queue for at least one cycle until a full group of instructions is accumulated at the instruction queue. At 610, after the full group of instructions is accumulated at the instruction queue, the IDU releases the stall and allows the instructions to dispatch on both the first side of the IDU and the second side of the IDU.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for balancing a global completion table (GCT) in a microprocessor, the method comprising:
   receiving instructions by an instruction dispatch unit (IDU) for processing by an instruction sequencing unit (ISU), wherein the IDU includes an instruction queue, a first dispatching side, and a second dispatching side, wherein the ISU includes a GCT comprising a first area and a second area;
   determining, by the IDU, whether a full group of instructions exists in the instruction queue;
   upon determining that a full group of instructions does not exist in the instruction queue, determining, by the IDU, whether additional instructions will be received by the instruction queue in a subsequent cycle;
   upon determining that additional instructions will be received by the instruction queue in a subsequent cycle, stalling, by the IDU, the instruction queue for at least one cycle until a full group of instructions is accumulated at the instruction queue; and
   after the full group of instructions is accumulated at the instruction queue, releasing the stall by the IDU and allowing the instructions to dispatch on both the first dispatching side of the IDU and the second dispatching side of the IDU;
   wherein the first area of the GCT is configured to manage instructions that are dispatched on the first dispatching side of the IDU, and wherein the second area of the GCT is configured to manage instructions that are dispatched on the second dispatching side of the IDU.

2. The computer-implemented of claim 1, wherein upon releasing the stall by the IDU, a first subset of the instructions are allowed to dispatch on the first dispatching side of the IDU to the first area of the GCT and a second subset of the instructions are allowed to dispatch on the second dispatching side of the IDU to the second area of the GCT.

3. The computer-implemented of claim 1 further comprising:
   upon determining that a full group of instructions exists in the instruction queue, allowing the instructions from the instruction queue to dispatch on both the first dispatching side of the IDU and the second dispatching side of the IDU without stalling, wherein a first subset of the instructions are allowed to dispatch on the first dispatching side of the IDU to the first GCT area and a second subset of the instructions are allowed to dispatch on the second dispatching side of the IDU to the second GCT area.

4. The computer-implemented of claim 1 further comprising:
   upon receiving feedback from the ISU, by the IDU, indicating that at least the first area of the GCT is starved, allowing instructions to dispatch on both the first dispatching side of the IDU and the second dispatching side of the IDU irrespective of whether a full group of instructions exists in the instruction queue, wherein a first subset of the instructions are allowed to dispatch on the first dispatching side of the IDU to the first area of the GCT and a second subset of the instructions are allowed to dispatch on the second dispatching side of the IDU to the second area of the GCT.

5. The computer-implemented of claim 1 further comprising:
   upon receiving feedback from the ISU, by the IDU, indicating that the first or second areas of the GCT are full, stalling, by the IDU, the instruction queue for at least one cycle irrespective of whether a full group of instructions exists in the instruction queue.

6. The computer-implemented of claim 1, wherein the instruction queue is configured to receive up to six ungrouped instructions per cycle and to produce up to two triplets of grouped instructions per cycle from the received ungrouped instructions.

7. A system for balancing a global completion table (GCT) in a microprocessor, the system comprising:
   an instruction dispatch unit (IDU) comprising an instruction queue, a first dispatching side, and a second dispatching side, wherein the instruction queue is configured to receive instructions; and
   an instruction sequencing unit (ISU) comprising a GCT, wherein the GCT includes a first area and a second area, wherein the first area of the GCT is configured to receive instructions that are dispatched from the first dispatching side of the IDU, and wherein the second area of the GCT is configured to receive instructions that are dispatched from the second dispatching side of the IDU;
   wherein the IDU is configured to:
      determine whether a full group of instructions exists in the instruction queue;
      upon determining that a full group of instructions does not exist in the instruction queue, determine whether additional instructions will be received by the instruction queue in a subsequent cycle;
      upon determining that additional instructions will be received by the instruction queue in a subsequent cycle, stall the instruction queue for at least one cycle until a full group of instructions is accumulated at the instruction queue; and
      release the stall and allow the instructions to dispatch on both the first dispatching side of the IDU and the second dispatching side of the IDU after the full group of instructions is accumulated at the instruction queue;
   wherein the first area of the GCT is configured to manage instructions that are dispatched on the first dispatching side of the IDU, and wherein the second area of the GCT is configured to manage instructions that are dispatched on the second dispatching side of the IDU.

8. The system of claim 7, wherein upon releasing the stall by the IDU, a first subset of the instructions are allowed to dispatch on the first dispatching side of the IDU to the first area of the GCT and a second subset of the instructions are allowed to dispatch on the second dispatching side of the IDU to the second area of the GCT.

9. The system of claim 7, wherein the IDU is further configured to:
   upon determining that a full group of instructions exists in the instruction queue, allow the instructions from the instruction queue to dispatch on both the first dispatching side of the IDU and the second dispatching side of the IDU without stalling, wherein a first subset of the instructions are allowed to dispatch on the first dispatching side of the IDU to the first GCT area and a second subset of the instructions are allowed to dispatch on the second dispatching side of the IDU to the second GCT area.

10. The system of claim 7, where the IDU is further configured to:
upon receiving feedback from the ISU indicating that at least the first area of the GCT is starved, allow instructions to dispatch on both the first dispatching side of the IDU and the second dispatching side of the IDU irrespective of whether a full group of instructions exists in the instruction queue, wherein a first subset of the instructions are allowed to dispatch on the first dispatching side of the IDU to the first area of the GCT and a second subset of the instructions are allowed to dispatch on the second dispatching side of the IDU to the second area of the GCT.

11. The system of claim 7, where the IDU is further configured to:
upon receiving feedback from the ISU indicating that the first or second areas of the GCT are full, stall the instruction queue for at least one cycle irrespective of whether a full group of instructions exists in the instruction queue.

12. The system of claim 7, wherein the instruction queue is configured to receive up to six ungrouped instructions per cycle and to produce up to two triplets of grouped instructions per cycle from the received ungrouped instructions.

13. A computer program product for balancing a global completion table (GCT) in a microprocessor, the computer program product comprising a computer readable storage medium having program instructions embodied therewith, the program instructions executable by an electronic computer processor to cause the processor to perform a method comprising:
receiving instructions by an instruction dispatch unit (IDU) for processing by an instruction sequencing unit (ISU), wherein the IDU includes an instruction queue, a first dispatching side, and a second dispatching side, wherein the ISU includes a GCT comprising a first area and a second area;
determining, by the IDU, whether a full group of instructions exists in the instruction queue;
upon determining that a full group of instructions does not exist in the instruction queue, determining, by the IDU, whether additional instructions will be received by the instruction queue in a subsequent cycle;
upon determining that additional instructions will be received by the instruction queue in a subsequent cycle, stalling, by the IDU, the instruction queue for at least one cycle until a full group of instructions is accumulated at the instruction queue; and
after the full group of instructions is accumulated at the instruction queue, releasing the stall by the IDU and allowing the instructions to dispatch on both the first dispatching side of the IDU and the second dispatching side of the IDU;
wherein the first area of the GCT is configured to manage instructions that are dispatched on the first dispatching side of the IDU, and wherein the second area of the GCT is configured to manage instructions that are dispatched on the second dispatching side of the IDU.

14. The computer program product of claim 13, wherein upon releasing the stall by the IDU, a first subset of the instructions are allowed to dispatch on the first dispatching side of the IDU to the first area of the GCT and a second subset of the instructions are allowed to dispatch on the second dispatching side of the IDU to the second area of the GCT.

15. The computer program product 13, wherein the method further includes:
upon determining that a full group of instructions exists in the instruction queue, allowing the instructions from the instruction queue to dispatch on both the first dispatching side of the IDU and the second dispatching side of the IDU without stalling, wherein a first subset of the instructions are allowed to dispatch on the first dispatching side of the IDU to the first GCT area and a second subset of the instructions are allowed to dispatch on the second dispatching side of the IDU to the second GCT area.

16. The computer program product 13, wherein the method further includes:
upon receiving feedback from the ISU, by the IDU, indicating that at least the first area of the GCT is starved, allowing instructions to dispatch on both the first dispatching side of the IDU and the second dispatching side of the IDU irrespective of whether a full group of instructions exists in the instruction queue, wherein a first subset of the instructions are allowed to dispatch on the first dispatching side of the IDU to the first area of the GCT and a second subset of the instructions are allowed to dispatch on the second dispatching side of the IDU to the second area of the GCT.

17. The computer program product of claim 13, wherein the method further includes:
upon receiving feedback from the ISU, by the IDU, indicating that the first or second areas of the GCT are full, stalling, by the IDU, the instruction queue for at least one cycle irrespective of whether a full group of instructions exists in the instruction queue.

18. The computer-implemented of claim 13, wherein the instruction queue is configured to receive up to six ungrouped instructions per cycle and to produce up to two triplets of grouped instructions per cycle from the received ungrouped instructions.

\* \* \* \* \*